United States Patent [19]

Beinert et al.

[11] Patent Number: 5,595,810

[45] Date of Patent: Jan. 21, 1997

[54] DECORATIVE LABELS AND METHOD OF THEIR PRODUCTION

[75] Inventors: Norbert Beinert, Hofheim-Lorsbach; Manfred Knote, Bad Tölz; Gottfried Philipp, Holzkirchen; Christian von Tluck und Toschonowitz, Schaftlach, all of Germany

[73] Assignee: Zweckform Büro-Produkte GmbH, Oberlaindern, Germany

[21] Appl. No.: 222,741

[22] Filed: Apr. 1, 1994

[30]     Foreign Application Priority Data

Apr. 5, 1993 [DE] Germany ........................ 43 11 200.5

[51] Int. Cl.⁶ ................................................ B32B 31/20
[52] U.S. Cl. ...................... 428/156; 156/219; 156/240; 156/272.6; 156/289; 428/354; 428/157
[58] Field of Search ........................ 156/219, 209, 156/240, 289, 272.6; 428/354, 156, 157, 170; 264/293, 284

[56]           References Cited

U.S. PATENT DOCUMENTS

| | | | |
|---|---|---|---|
| 2,729,009 | 1/1956 | Markus et al. | 156/219 |
| 4,115,612 | 9/1978 | Closson, Jr. | 156/219 |
| 4,240,857 | 12/1980 | DellaVecchia et al. | 156/209 |
| 4,581,088 | 4/1986 | House | 156/219 |
| 4,587,158 | 5/1986 | Ewing | 156/240 |
| 4,650,533 | 3/1987 | Parker et al. | 156/219 |
| 5,204,206 | 4/1993 | Iwase et al. | 156/240 |
| 5,468,535 | 11/1995 | Amano et al. | 428/354 |

*Primary Examiner*—Michele K. Yoder
*Attorney, Agent, or Firm*—Dilworth & Barrese

[57]           ABSTRACT

A method for the production of environmentally compatible decorative labels, which are produced without using a PVC film, is described. The method involves the application of an embossing film, which is capable of transferring heat, on a substrate comprising a separation paper, an adhesive layer, and a plastic film made of homopolymers or copolymers of ethylene with a crystallite melting point (DIN 53765) of 110° to 120° C., a heat of fusion (DIN 53765) of 125 to 180 J/g, melt index (DIN 53735) of 2.0 to 3.5 g/10 min. The embossing film contains a melt adhesive layer that can be activated at 110° to 230° C. The embossing process takes place at a temperature of 110° to 230° C. under a pressure of 1.0 to 7.0 bar for a period of 3 to 0.3 sec.

31 Claims, 4 Drawing Sheets

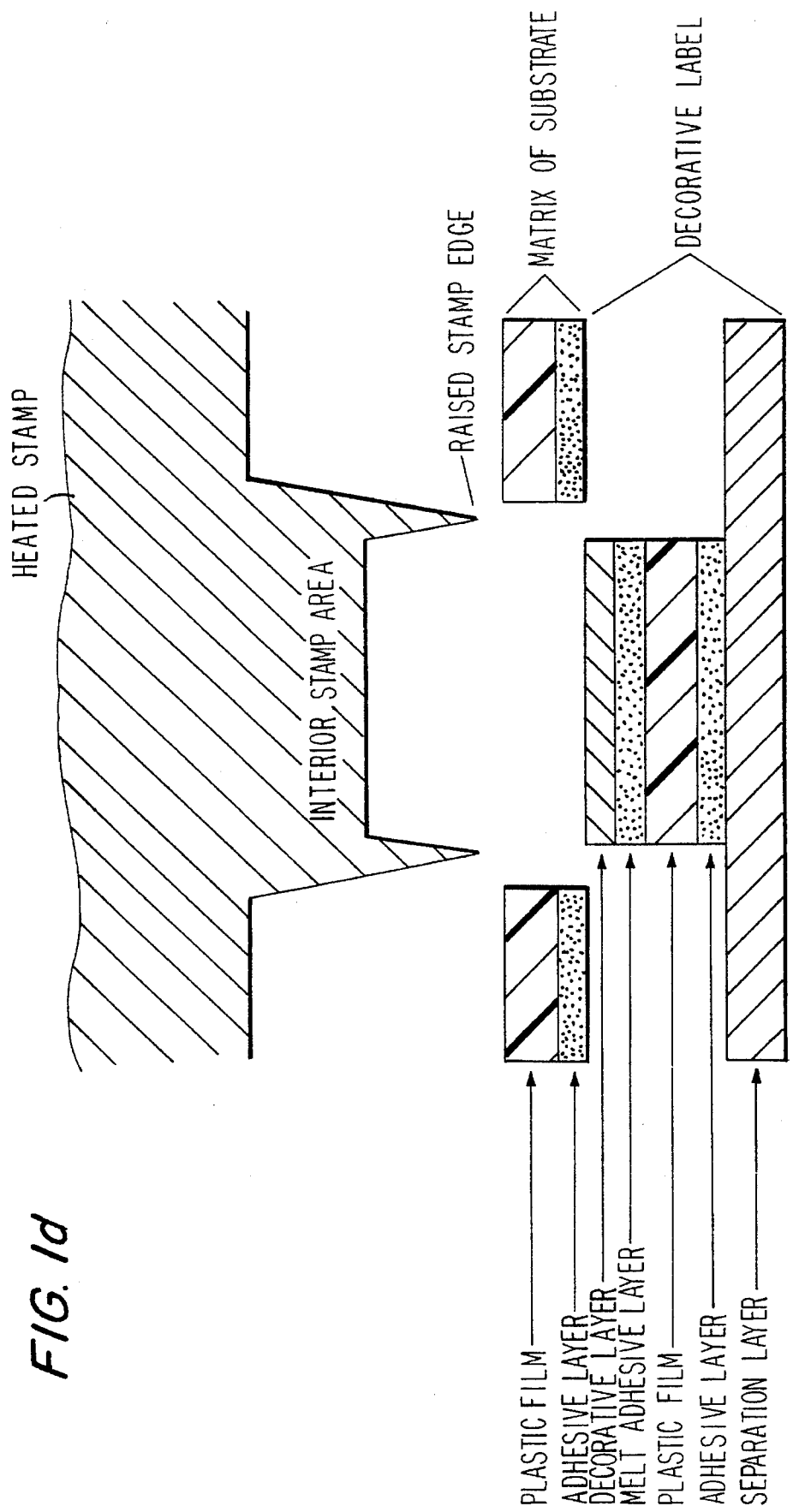

DECORATIVE LABELS AND METHOD OF THEIR PRODUCTION

BACKGROUND OF THE INVENTION

The invention concerns, a method for the production of decorative labels and the decorative labels themselves, which can be obtained according to this method.

A common method for the production of decorative labels consists of placing an embossing film on a substrate, using pressure and/or heat. Here, an embossing film capable of transferring heat and containing a carrier layer, a separation layer, one or more decorative layers, and a melt adhesive layer, is generally first applied on a substrate, which comprises a separation paper, an adhesive layer, and a plastic film, in such a way that the melt adhesive layer of the embossing film and the plastic film of the substrate face one another.

In a second step, the above combination consisting of an embossing film and substrate is embossed with a heated stamp, whose stamp area bears a certain motif and exhibits raised edges in comparison to the interior of the stamp area and acts on the carrier layer of the embossing film, so that within the stamp area, the embossing film and substrate are bonded to one another via the melt adhesive layer. The edges of the stamp area act simultaneously like a punching line, wherein during the embossing process in the area of the edges, the separation layer, decorative layer(s), and melt adhesive layer of the embossing film—and the plastic film and adhesive layer of the substrate are fused and punched through.

The carrier layer of the embossing film is subsequently removed, wherein the parts of the embossing film that are not bonded to the substrate are also removed from it.

Finally, the parts of the plastic film and the adhesive layer of the substrate that lie outside the confines of the stamp motif (stamp area) are removed.

The method of the aforementioned type is, for example, described in U.S. Pat. No. 4,581,088.

The plastic film used in the substrate, as a rule, consists of colored polyvinyl chloride (PVC), wherein an aluminum film can also be provided between the adhesive film of the substrate and the PVC film.

A plastic film made of polyvinyl chloride, however is no longer desired because of concerns having to do with environmental protection and because of health hazards due to plasticizers that are eventually present in the polyvinyl chloride or residual monomers of vinyl chloride, so that there is an urgent need to replace the PVC film in decorative labels, which are frequently handled by children in particular. Here, however, there is a problem to the effect that until now, no plastic material is known, aside from PVC, that is suitable for the hot embossing process of the aforementioned type because of its heat-resistance capability and its melt behavior.

SUMMARY OF THE INVENTION

The goal of the invention under consideration consists of creating a method for the production of decorative labels, which avoids the use of a polyvinyl chloride film. Another goal consists of making available decorative labels without PVC.

The aforementioned tasks are solved by a method for the production of decorative labels, comprising the following steps:

a) the application of an embossing film capable of transferring heat and containing a carrier layer, a separation layer, one or more decorative layers, and a melt adhesive layer, on a substrate comprising a separation paper an adhesive layer, and a plastic film, in such a way that the melt adhesive layer of the embossing film and the plastic film of the substrate face one another (FIG. 1a), b) embossing of the above combination of embossing film and substrate with a heated stamp, whose stamp area bears a certain motif, exhibiting raised edges in comparison to the interior of the stamp area and acting on the carrier layer of the embossing film, so that within the stamp area the embossing film and the substrate are bonded to one another via the melt adhesive layer, and with the separation layer, decorative layer(s), and melt adhesive layer of the embossing film, along with the plastic film and adhesive layer of the substrate, being fused and punched through in the area of the raised edges (FIG. 1b);

c) removal of the carrier layer of the embossing film and the parts of the embossing film that are not bonded to the substrate (FIG. 1c); and d) removal of the parts of the plastic film and the adhesive layer of the substrate that lie outside the confines of the stamp motif (stamp area)(FIG. 1d);

characterized by the fact that one uses homopolymers or copolymers of ethylene, with a crystallite melting point (DIN 53765) of 110° to 120° C., a heat of fusion (DIN 53765) of 125 to 180 J/g, and a melt index (DIN 53735) of 2.0 to 3.5 g/10 min, as a plastic film in the substrate; and one selects, for the embossing film, a melt adhesive layer that can be heat-activated in the range of 110° to 230° C. and carries out the embossing process at a temperature of 110° to 230° C. under a pressure of 1.0 to 7.0 bar for a period of 3 to 0.3 sec. The terms DIN and FINAT (below) respectively refer to standardized test methods for the determination of specific properties and which are well-recognized and well-documented. In particular, DIN 53765 refers to DIN test method no 53765 for the testing of plastics and elastomers, especially thermal analysis by the DSC method. DIN 53735 refers to DIN test method no 53735 for determining melt flow index of thermoplastics.

BRIEF DESCRIPTION OF THE DRAWINGS

The present invention will be further described with reference to the accompanying drawings in which:

FIG. 1d schematically illustrates a fourth step in the process of the present invention.

DESCRIPTION OF THE PREFERRED EMBODIMENTS

Figure 1A:
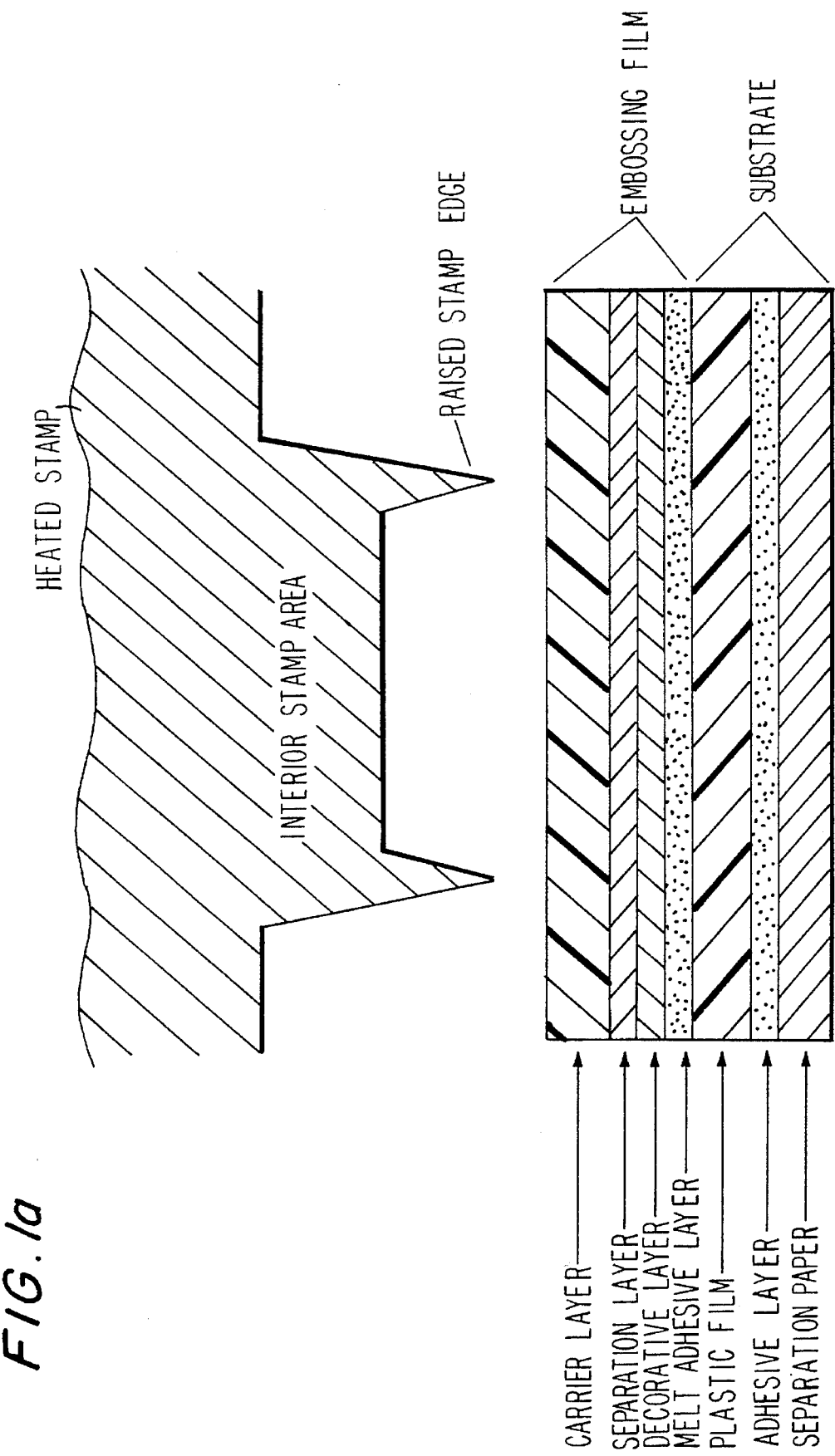
FIG. 1a schematically illustrates a first step in the process of the present invention.
Figure 1B:
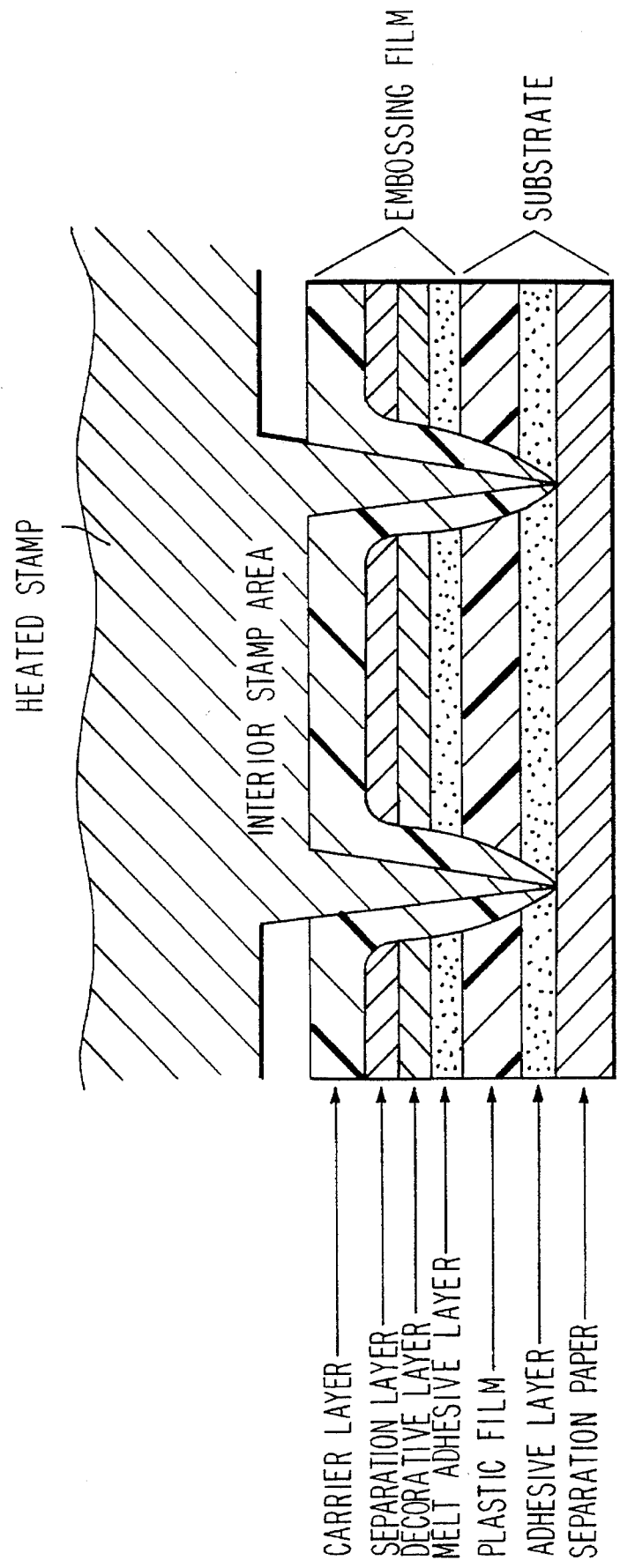
FIG. 1b schematically illustrates a second step in the process of the present invention.
Figure 1C:
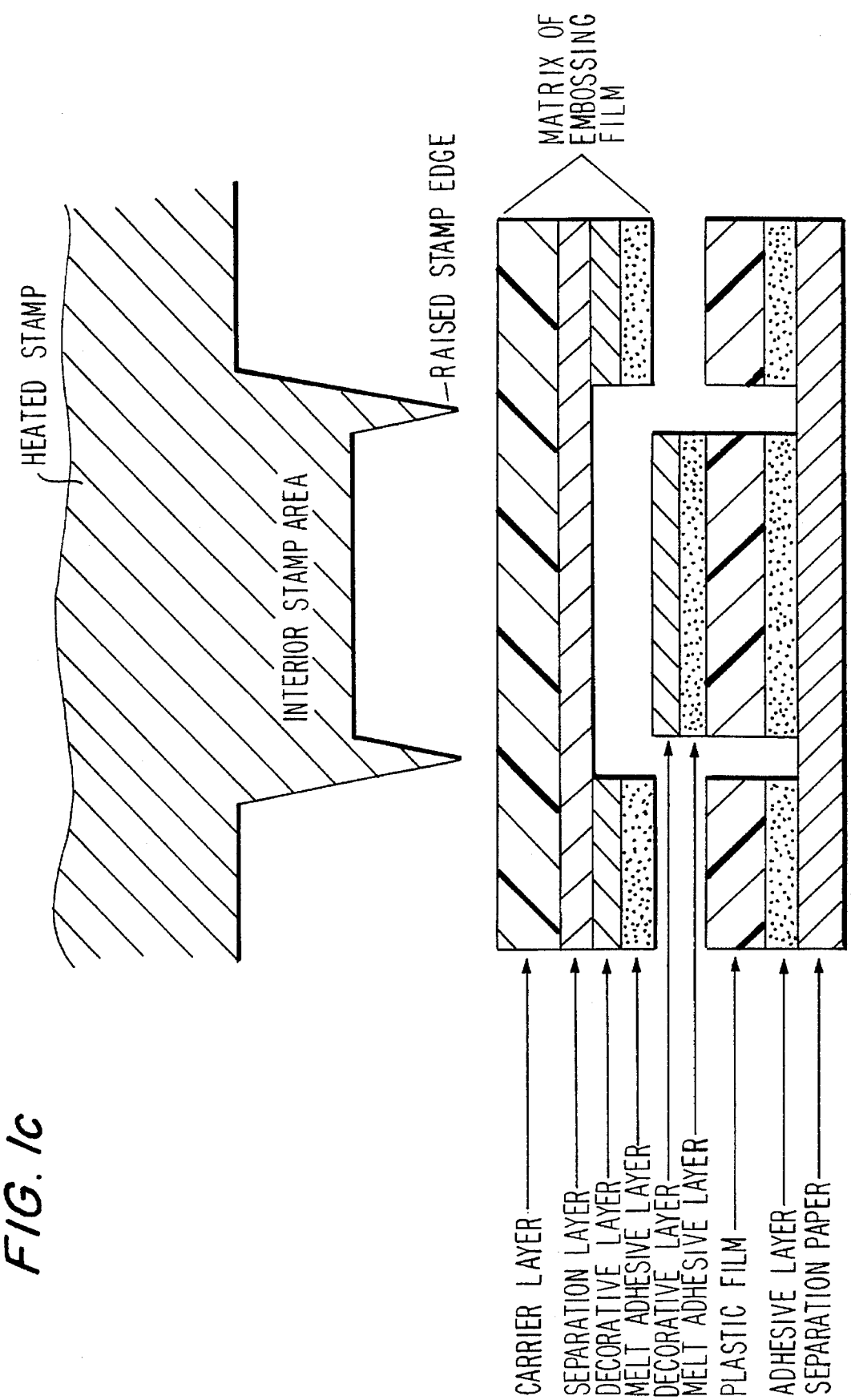
FIG. 1c schematically illustrates a third step in the process of the present invention.

In a specific embodiment of the method in accordance with the invention, a suitable low-density polyethylene (LDPE) is used as a plastic film in the substrate. The thickness of the film is hereby preferably 20 to 200 μm.

Solvent adhesives, aqueous adhesive dispersions, or hot-melt adhesives, which are preferably based on poly(meth)acrylates and/or rubber compounds, can be used for the adhesive layer in the substrate. The adhesive is hereby preferably applied in a quantity of 5 to 25 g/m$^2$, wherein 15 to 20 g/m$^2$ is particularly preferred. The application can take place on the entire area or partially by rolling or via a printing process (flexographic printing, screen printing).

Silicone paper is preferably used as the separation paper of the substrate. By this, one means, on the one hand, calendered or supercalendered paper, which is provided with a silicone layer. On the other hand, the silicone paper can also contain combinations of paper, a coating, or a polyethylene film, and a silicone layer.

The silicone paper hereby exhibits, in the most favorable case, a basis weight of 50 to 300 g/m$^2$, a thickness of 50 to 300 µm, and separation values (FiNAT FTM3) of 0.05 to 0.5 N/25 mm. FINAT FTM3 refers to FINAT test method no. 3 for determining force necessary to separate a label coated with an adhesive from the support (protection) material.

In another specific embodiment of the method in accordance with the invention, the plastic film of the substrate is provided with an adhesive layer (primer) on one or both sides. The thickness of this adhesive layer is hereby preferably 2 to 10 µm.

In accordance with another specific embodiment, the surface of the plastic film of the substrate is pretreated with corona or plasma discharge.

A polyester film, which preferably has a thickness of 4 to 10 µm, is advantageously used as a carrier layer in the embossing film for reasons having to do with heat resistance.

A wax layer, which melts when acted en by heat and makes possible an easy separation of the carrier layer of the embossing film, can be used as a separation layer in the embossing film.

The decorative layers in the embossing film comprise nonpigmented transparent lacquer layers, pigmented lacquer layers, and or metal layers. The individual lacquer layers hereby preferably exhibit a thickness of 0.5 to 5 µm, whereas the metal layers, which are applied by evaporation or by cathode sputtering, preferably have a thickness in the range of 50 nm. The individual layers can also be provided with a two- or three-dimensional pattern.

In a specific embodiment, the decorative layers in the embossing film comprise a pigmented lacquer layer or metal layer on the side facing the melt adhesive layer and a nonpigmented lacquer layer on the side facing the separation layer.

With regard to the sequence of the individual steps of the method, there are several variants of the method described above. Thus, for example, in step b), the embossing film and substrate are first bonded on an entire area via the melt adhesive layer at a temperature of 110° to 200° C. under a pressure of 1.0 to 5.5 bar for a period of 1 to 0.01 sec, for example, with the use of a stamp or a pressure roller with a smooth surface, before the combination of the embossing film and substrate is embossed with a heated stamp. The stamp area bears a certain motif and exhibits raised edges in comparison to the interior of the stamp area and acts on the carrier layer of the embossing film, so that within the embossing area, the separation layer, the decorative layer(s), and the melt adhesive layer of the embossing film, along with the plastic film and adhesive layer of the substrate, are fused and punched through in the area of the raised edges, wherein in step c), the carrier layer of the embossing film is removed, and in step d), the parts of the embossing film, the plastic film, and the adhesive layer of the substrate that lie outside the confines of the stamp motif (stamp area) are removed.

In order to obtain a decorative label with a particularly good spatial effect, the method variant described above can be modified by removing the carrier layer of the applied embossing film in step b) after the thermal bonding of the entire area of the embossing film and substrate, then applying a second embossing film with a different decoration consisting of a carrier layer, separation layer, one or more decoration layers, and a melt adhesive layer, which can be activated in the range of 110° to 230° C., on the part of the first embossing film remaining on the substrate in such a way that the melt adhesive layer of the second embossing film faces the decoration layer(s) of the first embossing film. The second embossing layer on the decoration layer(s) of the first embossing film is embossed with a stamp whose stamp area exhibits area-recessing, outer contour patterns with raised edges at a temperature of 110° to 230° C., under a pressure of 1.0 to 7.0 bar for a period of 3 to 0.3 sec, so that in the immediate area of the contour patterns of the stamp area, the first and second embossing films are bonded to one another via the melt adhesive layer. In the area of the raised edges, the separation layers, decorative layers, and melt adhesive layers of the embossing films, along with the plastic film and adhesive layer of the substrate, are fused and punched through. Subsequently, in step c), the carrier layer of the second embossing film and the parts of the second embossing film that are not bonded to the first embossing film are removed from it. Finally, in step d), the parts of the first embossing film and the parts of the plastic film and the adhesive film of the substrate that lie outside the confines of the stamp motif (stamp area) are removed.

In a special form of the above modified method, using two embossing films, one can, during the embossing process in step b), use a stamp whose stamp area at the same time contains, in addition to the area-recessing, outer contour patterns with raised edges, inner, less raised contour lines so that the first and second embossing films are bonded in the area of the contour pattern and the contour lines via the melt adhesive layer, but the separation layers, decorative layers, and melt adhesive layers of the embossing films and the plastic film and the adhesive layer of the substrate are fused and punched through only in the area of the raised edges of the contour pattern.

In another refinement of the above modified method, one applies in step d), a third embossing film consisting of the carrier layer, separation layer, one or more decorative layers, and a melt adhesive layer, which can be activated in the range of 110° to 230° C., on the first embossing film in such a way that the melt adhesive layer of the third embossing film faces the decorative layer(s) of the first embossing film with the third embossing film being embossed on the decorative layer(s) of the first embossing film at a temperature of 110° to 230° C. under a pressure of 1.0 to 7.0 bar for a period of 3 to 0.3 sec with a second stamp, whose stamp area contains contour lines that lie inside the contour pattern of the first stamp but which are less raised than the edges of the first stamp, so that in the area of the inner contour lines (stamp area) the first and third embossing films are bonded to one other, however without the separation layers, decorative layer, and melt adhesive layers of the embossing films and the plastic film and the adhesive layer of the substrate being fused and punched through, then with the parts of the third embossing film that are not bonded to the first embossing film being removed.

In the embossing processes in accordance with the above method variants, a temperature of 150° to 180° C. and a pressure of 2.0 to 4.0 bar are preferably used for a period of 2 to 0.5 sec.

The bonding of the entire area of the substrate and the first embossing film preferably takes place with the above method variants at a temperature of 150°–180° C. under a pressure of 2.0 to 4.0 bar for a period of 0.6 to 0.02 sec.

The carrier layer used in the second or third embossing films and the decorative layers can have the preferred refinements mentioned in connection with the first embossing film.

The method in accordance With the invention facilitates the production of environmentally compatible decorative labels that are free of health hazards. This was made possible in particular by combining a homopolymer or copolymer of ethylene with special fused-mass and melting point characteristics and specifically agreed-on embossing parameters. In this way, it was possible to prevent, contrary to existing fears, warping of the plastic film during the embossing and the blurring of two- or three-dimensional patterns of the decorative layer(s), which made an exact contouring impossible.

The following is an example of the execution of the method in accordance with the invention, as well as a decorative label that can be obtained with this method.

EXAMPLE

A hot embossing film from the Oeser/Goeppingen Company (trade description: 95323860, sparkling green) was applied on a substrate consisting of a supercalendered, silicone-coated separation paper with a basis weight of 84 g/m$^2$, a polyacrylate-based adhesive layer with a basis weight of 20 g/m$^2$, and a polyethylene film with a thickness of 140 μm, a crystallite melting point (DIN 53765) of 116° C., a heat of fusion (DIN 53765) of 138 to 146 J/g, and a melt index (DIN 53735) of 2.8 g/10 min, wherein the surface of the polyethylene was protreated by means of corona discharge, then with the hot embossing film being bonded to the substrate by means of a heated pressure roller with a smooth surface at a temperature of 165° C. under a pressure of 3.0 bar for a period of 0.05 sec.

Subsequent to this, the carrier film of the above hot embossing film was removed and a second hot embossing film with a different color from Kurz/Fuerth Company (trade description: ALFM 18,931, silver) was applied on the remaining part of the first embossing film. This second hot embossing film was bonded to the first hot embossing film by means of a stamp, whose stamp area contained the outer, area-recessing contour pattern of a horse's head with raised contour edges and inner, less raised contour lines—in the shape, for instance, of a horse's mane—at an embossing temperature of 180° C. under an embossing pressure of 4.0 bar for an embossing time of 1.0 sec. At the same time, in the area of the outer contour edges, the separation layers, decorative layers, and melt adhesive layers of the two embossing films, along with the plastic film and adhesive layer of the substrate, were thereby fused and punched through.

Subsequently, the carrier layer of the second hot embossing film was removed, wherein also the parts of the second hot embossing film not bonded to the first hot embossing film were removed. Finally, the remaining parts of the first hot embossing film, the polyethylene film, and the adhesive layer of the substrate still outside the confines of the horse's head were removed.

We claim:

1. Method for the production of decorative labels, comprising the steps of:
    a) applying (i) an embossing film capable of transferring heat and comprising a carrier layer, a separation layer, at least one decorative layer and a melt adhesive layer that can be heat-activated in the range of 110° to 230° C. on (ii) a substrate comprising a separation paper, an adhesive layer and a plastic film comprising homopolymers or copolymers of ethylene having a crystallite melting point of 110° to 120° C., a heat of fusion of 125 to 180 J/g and a melt index of 2.0 to 3.5 g/10 min., in a manner such that the melt adhesive layer of embossing film (i) and the plastic film of the substrate (ii) face one another;
    b) embossing the aforementioned combination of the embossing film (i) and substrate (ii) at a temperature of 100° to 230° C., under a pressure of 1.0 to 7.0 bar and for a period of 3 to 0.3 sec. with a heated stamp having an area bearing a certain motif and raised edges in comparison to an interior of the stamp area, the stamp acting upon the carrier layer of the embossing film (i) so that
        within the stamp area, the embossing film (i) and substrate (ii) are bonded to one another via the melt adhesive layer, and
        the separation layer, at least one decorative layer and melt adhesive layer of the embossing film (i) and the plastic film and adhesive layer of the substrate (ii) are fused and punched through in the area of the raised edges of the stamp;
    c) removing the carrier layer of the embossing film (i) and parts of the embossing film (i) that are not bonded to the substrate (ii); and
    d) removing parts of the plastic film and the adhesive layer of the substrate (ii) that lie outside confines of the stamp motif (stamp area);
        whereby a label having an unimpaired decorative motif is produced without warping of the film or blurring of the pattern.

2. Method according to claim 1, wherein the plastic film in the substrate (i) consists of low-density polyethylene (LDPE).

3. Method according to claim 1, comprising
    providing a surface of the plastic film in the substrate (ii) with an adhesive layer (primer) on one or both sides thereof.

4. Method according to claim 1, comprising
    pretreating a surface of a plastic film in the substrate (ii) by means of corona or plasma discharge.

5. Method according to claim 1, wherein the separation paper in the substrate is a silicone paper.

6. Method according to claim 1, wherein the carrier layer in the embossing film (i) is formed from a polyester film.

7. Method according to claim 1, wherein the at least one decorative layer in the embossing film comprises at least one of a non-pigmented transparent lacquer layer, a pigmented lacquer layer and a metal layer.

8. Method according to claim 7, comprising
    providing in the embossing film (i), a pigmented layer or a metal layer on a side thereof facing the melt adhesive layer and providing a non-pigmented lacquer layer on a side thereof facing the separation layer.

9. Method according to claim 1, comprising
    carrying out the embossing step (b) at a temperature of 150° to 180° C., under a pressure of 2.0 to 4.0 bar and for a period of 2 to 0.5 sec.

10. Method according to claim 2, comprising
providing a surface of the plastic film in the substrate (ii) with an adhesive layer (primer) on one or both sides thereof.

11. Method according to claim 2, comprising
pretreating a surface of the plastic film in the substrate (ii) by means of corona or plasma discharge.

12. Method according to claim 1, wherein the plastic film comprises a thickness of 20 to 200 microns.

13. Method according to claim 1, comprising the additional step of
applying adhesive in a quantity of 5 to 25 g/m².

14. Method according to claim 13, wherein the adhesive is applied in a quantity of 15 to 20 g/m².

15. Method according to claim 3, wherein the adhesive layer comprises a thickness of 2 to 10 microns.

16. Method according to claim 6, wherein the polyester film comprises a thickness of 4 to 10 microns.

17. Method according to claim 7, wherein the individual lacquer layers comprise a thickness of 0.5 to 5 microns and the metal layer comprises a thickness in the range of 50 nm.

18. A decorative label embossed according to the method of claim 1 without warping of the film or blurring of the pattern, having an unimpaired decorative motif and comprising a plastic film composed of homopolymers or copolymers of ethylene having a crystallite melting point of 110° to 120° C., a heat of fusion of 125 to 180 J/g and a melt index of 2.0 to 3.5 g/10 min.

19. The label of claim 18, additionally comprising a separation layer composed of silicone paper exhibiting a basis weight of 50 to 300 g/m², thickness of 50 to 300 microns and a separation value of 0.05 to 0.5 N/25 mm.

20. Method for the production of decorative labels, comprising the steps of:

a) applying (i) an embossing film capable of transferring heat and comprising a carrier layer, a separation layer, at least one decorative layer and a melt adhesive layer that can be heat-activated in the range of 110° to 230° C. on (ii) a substrate comprising a separation paper, an adhesive layer and a plastic film comprising homopolymers or copolymers of ethylene having a crystallite melting point of 110° to 120° C., a heat of fusion of 125 to 180 J/g and a melt index of 2.0 to 3.5 g/10 min., in manner such that the melt adhesive layer of the embossing film (i) and the plastic film of the substrate (ii) face one another;

b) first bonding the embossing film (i) and substrate (ii) over an entire area via the melt adhesive layer at a temperature of 110° to 200° C., under a pressure of 1.0 to 5.5 bar and for a period of 1 to 0.01 sec., and then embossing the combination of the embossing film (i) and substrate (ii) with a heated stamp having a stamp area bearing a certain motif and raised edges in comparison to an interior of the stamp area, said stamp acting on the carrier layer of the embossing film (i) so that
within the stamp area, the separation layer, at least one decorative layer and melt adhesive layer of the embossing film (i) and the plastic film and adhesive layer of the substrate (ii) are fused and punched through in the area of the raised edges of the stamp;

c) removing the carrier layer of the embossing film (i); and d) removing parts of the embossing film (i) and the plastic film and adhesive layer of the substrate (ii) lying outside confines of the stamp motif (stamp area);

whereby a label having an unimpaired decorative motif is produced without warping of the film or blurring of the pattern.

21. Method of claim 20, wherein in step (b), embossing is carried out with the heated stamp at a temperature of 100° to 230° C., under a pressure of 1.0 to 7.0 bar and for period of 3 to 0.3 sec.

22. A method according to claim 20, comprising
bonding the substrate (ii) and embossing film (i) over the entire area at a temperature of 150° to 180° C., under a pressure of 2.0 to 4.0 bar and for a period of 0.6 to 0.02 sec.

23. A decorative label embossed according to the method of claim 20 without warping of the film or blurring of the pattern, having an unimpaired decorative motif and comprising a plastic film composed of homopolymers or copolymers of ethylene having a crystallite melting point of 110° to 120° C., a heat of fusion of 125 to 180 J/g and a melt index of 2.0 to 3.5 g/10 min.

24. Method for the production of decorative labels, comprising the steps of:

a) applying (i) an embossing film capable of transferring heat and comprising a carrier layer, a separation layer, at least one decorative layer and a melt adhesive layer that can be heat-activated in the range of 110° to 230° C. (ii) a substrate comprising a separation paper, an adhesive layer and a plastic film comprising homopolymers or copolymers of ethylene having a crystallite melting point 110° to 120° C., heat of fusion of 125 to 180 J/g and melt index of 2.0 to 3.5 g/10 min, in a manner such that the melt adhesive layer of the embossing film (i) and the plastic film of the substrate (ii) face one another;

b) first bonding the embossing film (i) and the substrate (ii) over an entire area via the melt adhesive layer at a temperature of 110° to 200° C., under a pressure of 1.0 to 5.5 bar and for a period of 1 to 0.01 sec.,
then removing the carrier layer of the applied embossing film (i),
applying a second embossing film (iii) with a different decoration consisting of a carrier layer, separation layer, at least one decorative layer and a melt adhesive layer which can be activated at 110° to 230° C. on a part of the first embossing film (i) remaining on the substrate (ii), in a manner such that the melt adhesive layer of the second embossing film (iii) faces the at least one decorative layer of the first embossing film (i),
embossing the second embossing film (iii) upon the at least one decorative layer of the first embossing film (i) with a stamp having an area exhibiting an area-recessing, outer contour pattern with raised edges, at a temperature of 110° to 230° C., under a pressure of 1.0 to 7.0 bar and for a period of 3 to 0.3 sec., so that
in an immediate area of contour patterns of the stamp, the first (i) and second (iii) embossing films are bonded to one another via the melt adhesive layer, and
in an area of the raised edges of the stamp, the separation layers, decorative layers, and melt adhesive layers of the embossing films (i) and (iii) along with the plastic film and the adhesive layer of the substrate (ii) are fused and punched through;

c) separating the carrier layer of the second embossing film (iii) and parts of the second embossing film (iii) that are not connected with the first embossing film (i); and d) removing parts of the first embossing film (i) and parts of the plastic film and adhesive layer of the substrate (ii) lying outside confines of the contour pattern (stamp area);

whereby a label having an unimpaired decorative motif is produced without warping of the film or blurring of the pattern.

25. Method according to claim 24, comprising using as the stamp in step (b), a stamp additionally containing inner, less-raised contour lines so that the first (i) and second (iii) embossing films are bonded in an area of the contour pattern and contour lines via the melt adhesive layer, and the separation layers, decorative layers, and melt adhesive layers of the embossing films (i) and (iii) and the plastic film along with the adhesive layer of the substrate (ii) are fused and punched through only in the area of the raised edges of the contour pattern.

26. Method according to claim 24, wherein the substrate (ii) and the first embossing film (i) are bonded over the entire area at a temperature 150° to 180° C., under a pressure of 2.0 to 4.0 bar and for a period of time of 0.6 to 0.02 sec.

27. Method according to claim 25, wherein the substrate (ii) and the first embossing film (i) are bonded over the entire area at a temperature of 150° to 180° C., under a pressure of 2.0 to 4.0 bar and for a period of 0.6 to 0.02 sec.

28. A decorative label embossing according to the method of claim 24 without warping of the film or blurring of the pattern, having an unimpaired decorative motif and comprising a plastic film composed of homopolymers or copolymers of ethylene having a crystallite melting point of 110° to 120° C., a heat of fusion of 125 to 180 J/g and a melt index of 2.0 to 3.5 g/10 min.

29. Method for the production of decorative labels, comprising the steps of:

a) applying (i) an embossing film capable of transferring heat and comprising a carrier layer, a separation layer, at least one decorative layer, and a melt adhesive layer that can be heat-activated in the range of 110° to 230° C. on (ii) a substrate comprising a separation paper, an adhesive layer and a plastic film comprising homopolymers or copolymers of ethylene having a crystalline melting point of 110° to 120° C., a heat of fusion of 125 to 180 J/g and melt index of 2.0 to 3.5 g/10 min, in a manner such that the metal adhesive layer of the embossing film (i) and the plastic film of the substrate (ii) face one another;

b) first bonding the embossing film (i) and the substrate (ii) over an entire area via the melt adhesive layer at a temperature of 110° to 200° C., under a pressure of 1.0 to 5.5. bar and a period of 1 to 0.01 sec., then removing the carrier layer of the applied embossing film (i), applying a second embossing film (iii) with a different decoration consisting of a carrier layer, separation layer, at least one decorative layer and a melt adhesive layer which can be activated at 110° to 230° C. on a part of the first embossing film (i) remaining on the substrate (ii), in a manner such that the melt adhesive layer of the second embossing film (iii) faces the at least one decorative layer of the first embossing film (i), embossing the second embossing film (iii) upon the at least one decorative layer of the first embossing film (i) with a stamp having an area exhibiting an area-recessing, outer contour pattern with raised edges at a temperature of 110° to 230° C., under a pressure of 1.0 to 7.0 bar and for a period of 3 to 0.3 sec., so that in an immediate area of contour patterns of the stamp, the first (i) and second (iii) films are bonded to one another via the melt adhesive layer, and in an area of the raised edges of the stamp, the separation layers, decorative layers, and melt adhesive layers of the embossing films (i) and (iii) along with the plastic film and the adhesive layer of the substrate (ii) are fused and punched through;

c) separating the carrier layer of the second embossing film (iii) and parts of the second embossing film (iii) that are not connected with the first embossing film (i); and d) applying a third embossing film (iv) consisting of a separation layer, at least one decorative layer and a melt adhesive layer which can be activated in the range of 110° to 230° upon the first embossing (i), in a manner such that the melt adhesive layer of the third embossing film (iv) faces the at least one decorative layer of the first embossing film, embossing the third embossing film (iv) on the at least one decorative layer of the first embossing film (i) at a temperature of 110° to 230° C., under a pressure of 1.0 to 7.0 bar and for a period of 3 to 0.3 sec. with a second stamp having a stamp area containing contour lines lying within the contour pattern of the first stamp but are less raised than edges of the first stamp, so that in the area of the inner contour lines (stamp area), the first (i) and third (iv) embossing films are bonded to one another without the separation layers, decorative layers and melt adhesive layers of the embossing films (i) and (iv) along with the plastic film and adhesive layer of the substrate (ii) being fused and punched through, and then removing parts of the third embossing film (iv) that are not bonded to the first embossing film (i);

whereby a label having an unimpaired decorative motif is produced without warping of the film or blurring of the pattern.

30. Method according to claim 29, wherein the substrate (ii) and the first embossing film (i) are bonded over the entire area at a temperature of 150° to 180° C., under a pressure of 2.0 to 4.0 bar and for a period of 0.6 to 0.02 sec.

31. A decorative label embossing according to the method of claim 29 without warping of the film or blurring of the pattern, having an unimpaired decorative motif and comprising a plastic film composed of homopolymers or copolymers of ethylene having a crystallite melting point of 110° to 120° C., a heat of fusion of 125 to 180 J/g and a melt index of 2.0 to 3.5 g/10 min.

* * * * *